United States Patent [19]

Weiss

[11] 4,394,978
[45] Jul. 26, 1983

[54] METHOD FOR TREATMENT OF WASTE METAL AND LIQUID DROSS

[75] Inventor: Anton Weiss, Vienna, Austria
[73] Assignee: Waagner-Biro A.G., Austria
[21] Appl. No.: 232,309
[22] Filed: Feb. 6, 1981
[30] Foreign Application Priority Data

Feb. 18, 1980 [AU] Australia ................................ 870/80

[51] Int. Cl.³ ............................................. B02C 17/04
[52] U.S. Cl. ........................................ 241/23; 241/24; 241/26; 241/DIG. 14
[58] Field of Search ........................ 241/23, 24, 26, 29, 241/DIG. 14

[56] References Cited

U.S. PATENT DOCUMENTS

| | | | |
|---|---|---|---|
| 3,165,268 | 1/1965 | Hayssig | 241/24 |
| 3,534,910 | 10/1970 | Brumagin et al. | 241/23 |
| 3,644,104 | 2/1972 | Manevy | 241/24 X |
| 3,937,836 | 12/1975 | Thyrgood et al. | 241/24 X |
| 4,126,673 | 11/1978 | Cromwell | 241/29 X |
| 4,297,119 | 10/1981 | Ando et al. | 241/23 X |

FOREIGN PATENT DOCUMENTS 54-11895  1/1979  Japan ..................... 241/24
416091  7/1974  U.S.S.R. ............... 241/24

*Primary Examiner*—Howard N. Goldberg
*Attorney, Agent, or Firm*—Steinberg & Raskin

[57] ABSTRACT

In a method for treating liquid dross wherein the dross is situated in a skimming trough and charged into a rotating, substantially horizontal cooling pipe through which it passes so that the dross is cooled to a temperature below the melting point thereof to obtain a granulated form, the dross is charged from the skimming tank into the cooling pipe and passed therethrough substantially in the absence of air or oxygen whereupon the cooled granulated dross is subjected to an autogeneous grinding process, the ground dross then being separated into a granulated metal fraction and a fine-grained fraction. Apparatus for performing the method of the invention includes a hood located over the inlet side of the cooling pipe so that the entrance of air into the pipe is substantially prevented. The skimming trough is sealingly engaged to the hood so that the dross is charged from the skimming trough into the cooling pipe without any substantial contact with the air. An autogeneous grinding mill is provided having an inlet communicating with an outlet opening of the cooling pipe.

7 Claims, 2 Drawing Figures

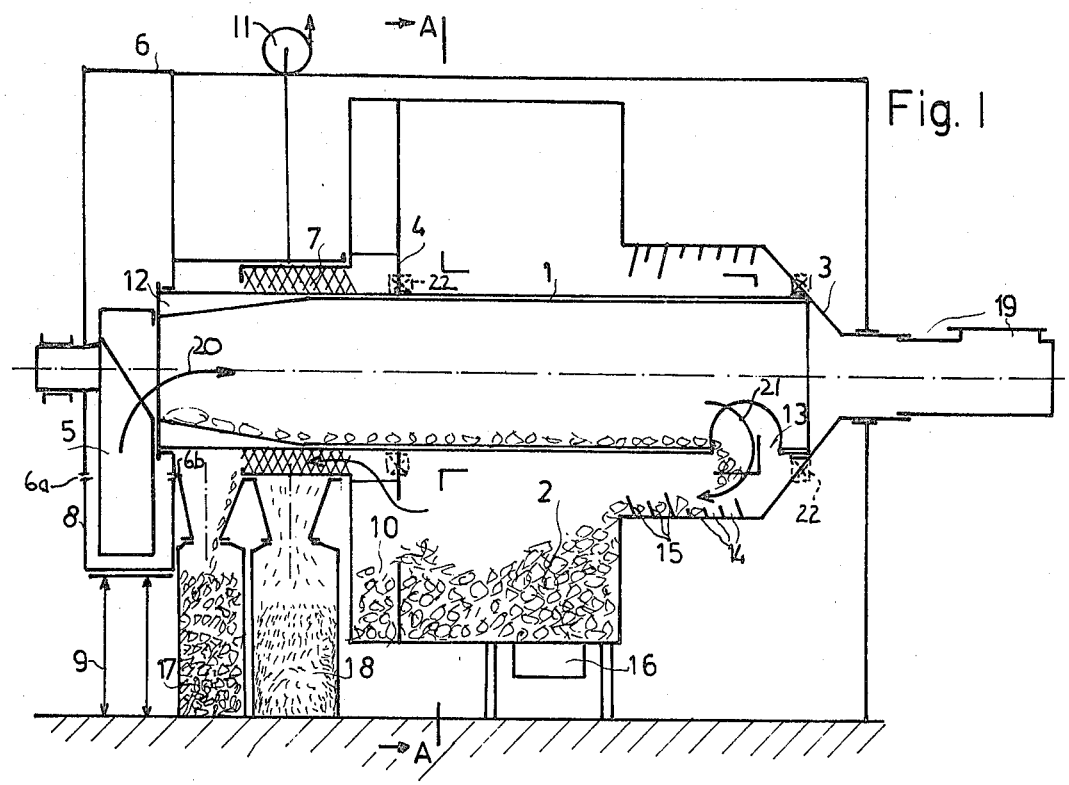
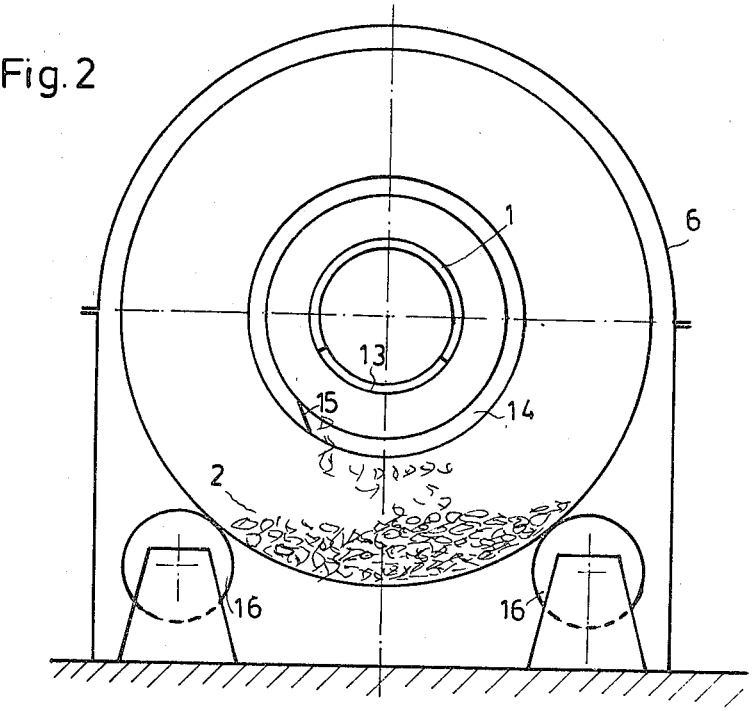

METHOD FOR TREATMENT OF WASTE METAL AND LIQUID DROSS

BACKGROUND OF THE INVENTION

The present invention relates to a method for the treatment of liquid dross and waste metal obtained in smelting and remelting plants and which is poured from the melting furnace into a skimming trough whereupon the dross is conveyed from the trough into a rotating, substantially horizontal cooling pipe in which it passes from one end to the other thereby becoming cooled below the melting point to obtain a granulated form. The invention further relates to apparatus for carrying out the method.

It is well known that waste metal and liquid dross obtained in the smelting and remelting of metal generally contain a substantial percentage of pure metal. For this reason, it is common practice for such waste metal and liquid dross to be collected and conveyed to separate recovery plants. According to the arrangement illustrated in German Offenlegungsschrift No. 27 13 281, which concerns the recovery of aluminum from aluminum dross, the hot aluminum dross is charged into a rotating open cooling drum in which it is cooled. The cooling and circulation of the dross in an open drum will of course result in oxidation of at least a portion of the aluminum due to contact with air. This results on the one hand in an increase in the temperature of the dross which must of course be compensated for through increased cooling action and on the other hand a decreased yield in the amount of pure aluminum recovered. Since aluminum oxide has a lower market value than pure aluminum, the economy of the procedure is not as high as is desired.

SUMMARY OF THE INVENTION

Accordingly, the main object of the present invention is to provide new and improved methods for treating liquid dross so as to increase the amount of pure metal recovered therefrom.

It is understood that the method of the present invention is applicable to the recovery of most metallic substances such, for example, as aluminum, zinc, lead, etc.

Briefly, in accordance with the present invention, this and other objects are obtained by providing a method wherein the hot liquid dross is cooled in the absence of air or oxygen and preferably while in an inert gas atmosphere. The apparatus for performing the method is constructed such that the space occupied thereby is relatively small so that the recovery apparatus can be erected proximate to the location from which the dross is obtained.

According to the method of the invention, the cooled dross in granulated form is subjected to a subsequent grinding operation since the pure metallic material is found in greatest quantities in larger particles and the majority of the oxides and other impurities are present in the dust or fine-grained phase. Furthermore, yields are improved by the removal of dust in a screening station to which the dross is directed subsequent to the grinding operation since the oxide-rich fine dust can then be separated from the other fractions.

Thus, according to the present invention, the hot liquid dross is cooled in the absence of air or oxygen, such as under an inert gas atmosphere, after which the granulated dross is subjected to an autogenous grinding process. The ground dross is then separated, preferably by screening, into a granulated metal fraction and into a fine-grained fraction containing substantially powdered metal oxide.

Apparatus for performing the method of the invention includes a hood located over the inlet side of the cooling pipe into which the liquid dross is charged so that the entrance of air into the cooling pipe through the inlet opening is prevented. The skimming trough from which the dross is charged into the cooling pipe is sealingly engaged to the hood so that the dross is charged into the cooling pipe without any substantial contact with air.

Other features of the method of the present invention will be described in greater detail hereinbelow.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which:

FIG. 1 is a side elevation view in schematic form illustrating one embodiment of treatment apparatus for performing a method according to the present invention; and FIG. 2 is a section view taken along line A—A of FIG. 1.

DESCRIPTION OF THE PREFERRED EMBODIMENTS

Referring now to the drawings wherein like reference characters designate identical or corresponding parts throughout the several views, the treatment apparatus illustrated in the figures are based on an embodiment of the invention for treating aluminum dross. However, as noted above, the present invention is equally applicable to the recovery of metals other than aluminum.

The treatment apparatus comprises a rotatably mounted substantially horizontal cooling pipe 1 into the inlet side of which the liquid dross is charged from a skimming trough 8 by means of a bucket elevator 5. A hood 6 is located over the inlet side of the cooling pipe 1. The skimming trough 8 sealingly engages hood 6. Thus, hood 6 includes sealing means 6a, 6b and the skimming trough 8 is urged to sealing engagement with sealing means 6a as by means of a table schematically shown at 9 on which the skimming trough 8 is placed by a fork lift or the like. The hood communicates with a source of inert gas.

In the above manner, entry of air into the cooling pipe is substantially prevented and the dross is charged from the skimming trough into the cooling pipe without substantial contact with air. This has the beneficial result that the aluminum (or other metal) no longer oxidizes as the dross moves through the cooling pipe so that increased yields of pure metal can be recovered and the temperature of the dross will not increase due to oxidation thereby decreasing the energy required for cooling.

The dross is charged from the skimming trough into the cooling pipe 1 by a bucket elevator 5 which substantially comprises two shovel-type arms which alternately lift the dross from the skimming trough 8 and conduct the dross in the direction of the axis of rotation through the inlet side of cooling pipe 1 as shown by arrow 20. In this manner the dross is charged from the skimming trough into the cooling pipe in an intermittent manner which facilitates the cooling thereof.

Cooling pipe 1 comprises a double-walled jacket through which a cooling liquid such, for example, as water, flows. In order to promote the forward movement of the dross in the cooling pipe 1, the inner wall of the pipe has an inwardly tapered or conical configuration 12 at the inlet end thereof. Thus, a downward sloping surface is presented to the dross at the initial end of the cooling pipe 1 so that the dross is prevented from backing up in the cooling pipe and possibly falling back into the skimming trough 8. The cooling pipe 1 is continually rotated in a manner described below so that the dross will wet only a portion of the circular cross-section of the inner surface thereof in a manner similar to an autogenous mill and is urged forwardly through the cooling pipe under its own weight. During this movement through the cooling pipe, the dross is cooled through contact with the inner wall and discharged in granulated form through a discharge opening 13 formed in pipe 1 into the inlet 14 of autogenous mill 2.

The autogenous mill 2 comprises a grinding drum having a substantially circular cross section and defined by end faces 3 and 4. The cooling pipe 1 is mounted substantially coaxially with respect to the mill 2 and in the illustrated embodiment is fixed thereto at end walls 3 and 4 for rotation therewith. In this connection, drive wheels 16 rotate both the cooling pipe 1 and grinding mill 2 as a fixed unit so that both rotate at the same speed.

The section of mill 2 comprising inlet 14 has a reduced diameter cross section in which substantially helical webs 15 are provided onto which the granulated dross falls from the discharge opening 13 of pipe 1. The helical web 15 acts on the dross not only to direct the same into the main section of the mill 2 but, additionally, to provide that dross will be maintained at the inlet section in amounts such that the same will provide a simple seal. Thus, the dross is directed as shown by arrow 21 from the discharge opening 13 of the cooling pipe into the inlet 14 of the mill wherein the helical webs 15 direct the same into the layer diameter portion thereof and at the same time accumulates the dross in a manner so as to seal the opening.

The autogenous mill is in constant rotation whereby the particulate solid dross is crushed upon itself, i.e., autogenously so as to produce a dust fraction and a granular fraction, the latter constituting both a coarse grained fraction 17 and a fine grained fraction 18. Since larger particles are deposited on the larger circumference of the autogenous mill, the discharge from the mill can be conveyed into a screening station 7 by discharge apparatus, designated 10, similar to bucket elevator 5 and which is rigidly connected to the drive of mill. Screening station 7 separates the discharged material into the coarse grained fraction 17 and the fine grained fraction 18, the fractions being themselves discharged into appropriate containers. The coarse grained fraction 17 will contain substantially pure aluminum while the fine grained fraction 18 will contain the bulk of aluminum oxide and other powdered impurities.

According to another feature of the present invention, the screening station 7 is preferably ventilated during operation by means of a dust exhaust 11 whereby the dust content of the fine grained fraction 18 is reduced and the relative content of aluminum metal increased.

In a modification of the embodiment illustrated in the figures, the cooling pipe 1 can be provided with a separate drive so that its rotation will be independent with respect to that of the autogenous mill. In this connection, the cooling pipe 1 can be mounted in its own bearings, designated in phantom at 22 on end faces 3 and 4 of the autogenous mill. Such construction is advantageous in that both the cooling pipe 1 and the mill 2 can be rotated at respective optimum speeds so that these components can be designed independently of each other.

The treatment apparatus of the present invention may also be provided with a feeding device 19 on the side opposite to that of bucket elevator 5 through which cooled dross can be fed into the mill 2 directly through discharge opening 13 and inlet 14 whereupon the cooled dross is crushed to the desired grain size. The feeding device 19 is hermetically sealed during the cooling operation so no air can enter since it is important according to the present invention that the liquid dross be cooled rapidly in the absence of air.

In one illustrative embodiment of the present invention, if it assumed that the volume of the cooling pipe and associated apparatus is about 2 cubic meters, such volume will contain about 80 decagrams of oxygen with which about 1 kilogram of metallic aluminum can be oxidized. This will correspond to a loss through oxidation of less than 1% in a charge of 300 kilograms of dross having an aluminum content of about 50%. Of course, such loss is insignificant in practice.

It is important for the inner wall of the cooling pipe in the inlet region of the liquid dross to be smooth and have no fittings so that the dross cannot settle on such fittings. A self-smoothing effect has been observed in the operation of such cooling pipes, i.e., after a short time of operation, a thin aluminum film is formed on the inner pipe wall which prevents further caking of aluminum.

As seen in FIG. 2, the discharge opening 13 of cooling pipe 1 has a relatively large passage which will of course necessarily limit the maximum grain size of the dross. Thus, if pieces of solid dross are to be charged directly into the cooling pipe, such as through feeding device 19, and such pieces are larger than the size of discharge opening 13, such pieces of solid dross must be broken up in a known manner, e.g., manually, prior to being so charged in order to permit the solid dross pieces to pass through the opening 13 into the grinding mill 2. The helical web 15 of inlet 14 of mill 2 preferably comprises a single unitary member and as noted above promotes the advancement of the granular dross. In the illustrated embodiment, a pair of rollers 16 drive the mill along with screening station and cooling pipe. Both rollers 16 are driven by a common motor which is not shown.

Obviously, numerous modifications and variations of the present invention as possible in the light of the above teachings. It is therefore to be understood that within the scope of the claims appended hereto the invention may be practiced otherwise than as specifically disclosed herein.

What is claimed is:

1. In a method for treating liquid dross obtained from metal smelting and remelting operations, such as in connection with aluminum extraction, including the steps of pouring the dross from the melting furnace into a skimming trough, charging the dross from the skimming trough into a rotating, substantially horizontal cooling pipe, passing the dross through the cooling pipe from one end to the other so that the inner surface thereof is at least partially wetted thereby, and so that the dross is cooled to a temperature below the melting point thereof and wherein it is granulated, the improvement comprising:

conducting the steps of charging the dross from the skimming trough into the cooling pipe and passing the dross through the cooling pipe substantially in the absence of air or oxygen;

subjecting the granulated dross to an autogenous grinding process; and separating the ground dross into a granulated metal fraction and a fine-grained fraction, the latter fraction containing substantially powdered metal oxide.

2. The method of claim 1 wherein said steps of charging and passing the dross are carried out in an inert atmosphere.

3. The method of claim 2 wherein said separating step is carried out by screening the ground dross.

4. The method of claim 1 wherein said step of charging the dross from the skimming trough into the cooling pipe comprises introducing the dross into the pipe by means of a bucket elevator.

5. The method of claim 1 wherein said step of subjecting the granulated dross to an autogenous grinding process includes passing the cooled dross from the cooling pipe into a grinding drum through a discharge opening provided at one end of the cooling pipe, and wherein the dross is directed at the discharge opening to substantially constitute a sealing medium between the cooling pipe and the grinding drum.

6. The method of claim 1 wherein said step of charging the dross from the trough into the cooling pipe comprises intermittently charging dross into the cooling pipe so that the cooling thereof in the pipe is accomplished intermittently.

7. The method of claim 1 wherein said separating step is carried out by screening the ground dross and further including the steps of exhausting fine dust produced during the autogenous grinding step during the screening of the dross.

* * * * *